United States Patent [19]
Harzer

[11] 3,881,153
[45] Apr. 29, 1975

[54] SYSTEM FOR MEASURING TRANSMISSION CHARACTERISTICS PROVIDED WITH VOICE COMMUNICATION EQUIPMENT

[75] Inventor: Peter Harzer, Eningen, Germany
[73] Assignee: Wandel u. Goltermann, Reutlingen, Germany
[22] Filed: Mar. 12, 1974
[21] Appl. No.: 450,455

[30] Foreign Application Priority Data
Mar. 14, 1973  Germany............................ 2312653

[52] U.S. Cl. ......................... 324/57 R; 179/175.3 R
[51] Int. Cl. ............................................ G01r 27/00
[58] Field of Search ............ 324/57 R; 179/175.3 R; 325/67, 133, 363

[56] References Cited
UNITED STATES PATENTS
| | | | |
|---|---|---|---|
| 3,414,809 | 12/1968 | Hoffman et al. .................. | 324/57 R |
| 3,678,379 | 7/1972 | Arvay et al. ...................... | 324/57 R |
| 3,821,495 | 6/1974 | Duff ............................. | 179/175.3 R |

Primary Examiner—Stanley T. Krawczewicz
Attorney, Agent, or Firm—Karl F. Ross; Herbert Dubno

[57] ABSTRACT

A system for measuring transmission characteristics, such as group delay, comprises a signal transmitter at one station and a signal receiver at another station interconnected by a test line, the transmitted test signal including a component of predetermined recurrence frequency detected by a gating circuit at the receiving station. The two stations are provided with voice-communication equipment, normally disconnected from the line, and with monitoring receivers responsive to incoming voice signals. At the transmitting station, the monitoring receiver is normally connected to the line through the signal transmitter by way of a differential amplifier balancing out the locally generated test signal. At the receiving station, the monitoring receiver is connectable to the signal receiver under the control of the gating circuit whenever the recurrent test-signal component is absent for a predetermined period.

16 Claims, 9 Drawing Figures

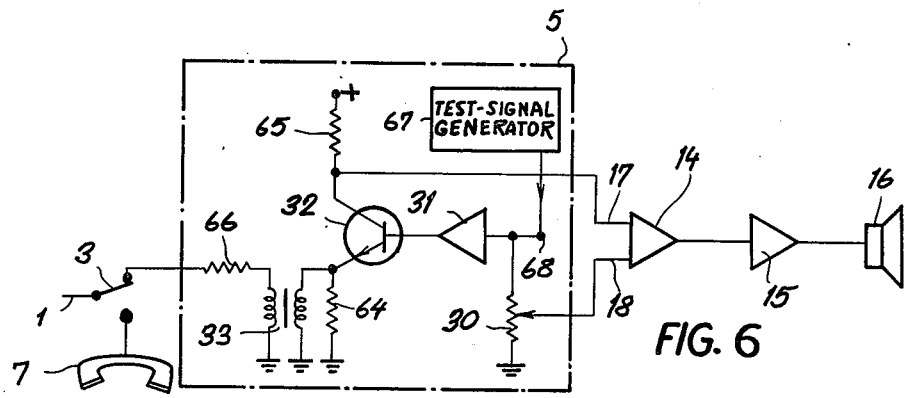
FIG. 6
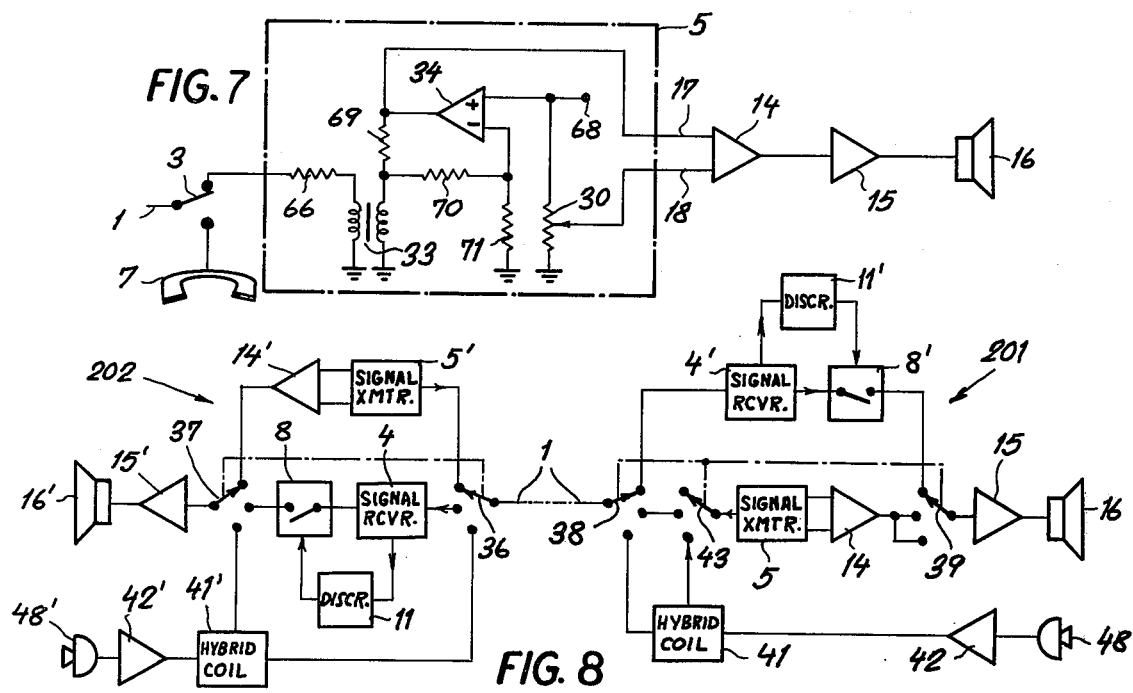
FIG. 7
FIG. 8
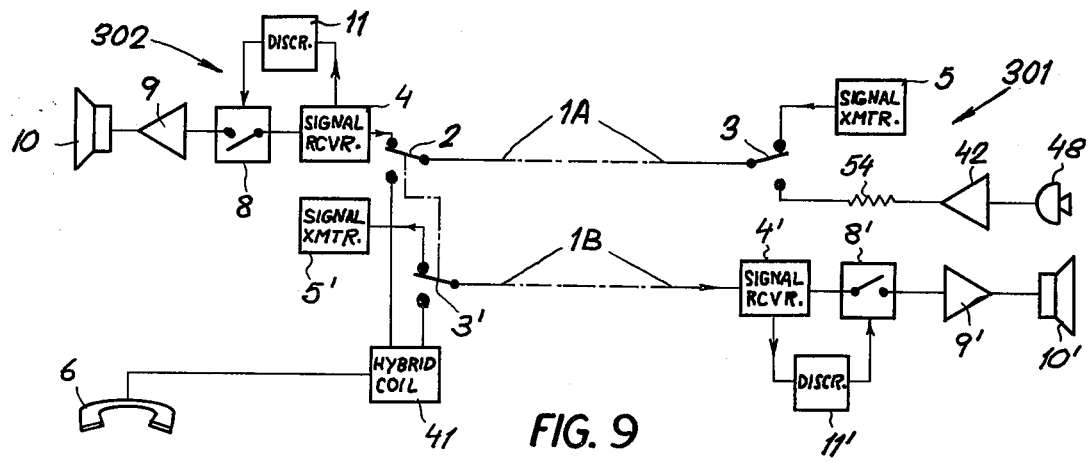
FIG. 9

SYSTEM FOR MEASURING TRANSMISSION CHARACTERISTICS PROVIDED WITH VOICE COMMUNICATION EQUIPMENT

FIELD OF THE INVENTION

My present invention relates to a system for measuring transmission characteristics, such as group delay, of a test object by passing a test signal through that object via a test line extending between a transmitting and a receiving station.

BACKGROUND OF THE INVENTION

In commonly owned U.S. Pat. No. 3,414,809 there has been disclosed a system of this type in which the group delay is measured by an a-c signal periodically changing between two carrier frequencies which are modulated by a so-called split frequency. Within each half-cycle of the changeover frequency, there occurs a short burst of a few cycles of a characteristic signal component, termed identification frequency in the patent, which at the receiving end is detected as a short pulse recurring with a predetermined periodicity. The purpose of this pulse, as more fully described in the patent referred to, is to insure proper phase synchronization at the two stations.

In many instances, especially if these stations are far apart, it is desirable to use the test line for occasional voice communication between the two operators. While a calling operator at a transmitting end could easily switch off the test signal and send voice currents over the line, his counterpart at the opposite end must be specially alerted to the change-over in order to switch from testing to voice communication and to prevent the incoming voice currents from interfering with the proper recording and interpretation of the test signals received.

OBJECTS OF THE INVENTION

The general object of my present invention, therefore, is to provide means in such a system for facilitating two-way voice communication between two stations across a test line with avoidance of the aforestated problem.

A more particular object is to provide means at a receiving station of such a system for distinguishing between incoming test signals and voice currents in order to apprise the operator of that station of the changeover taking place at the remote end.

SUMMARY OF THE INVENTION

In accordance with my present invention, I provide a monitoring receiver at each station responsive to incoming voice signals. The monitoring receiver of one station is connectable to the test line in decoupled relationship with an associated transducer serving for the transmission of test signals; the monitoring receiver at the other station is normally disconnected from the line and is connectable thereto by a discriminator in response to the absence of a periodically recurrent characteristic component of the test signal, such as the burst of identification frequency according to U.S. Pat. No. 3,414,809 referred to above, whereby this latter receiver reproduces the incoming voice signals in audible form or converts them into some other indication (e.g. the lighting of a lamp) apprising the local operator that his partner wishes to talk to him. Each station is provided with voice-communication equipment disconnected from the line during testing. A selector switch at each station enables a calling operator to disconnect the line from the corresponding transducer and to connect it instead to his voice-communication equipment whereupon the called operator, on being alerted by the monitoring receiver at the other station, will independently connect his voice-communication equipment to the line so that a two-way conversation can be carried on.

Advantageously, the discriminator of the monitoring receiver of at least one station is connectable to the line via a signal-receiving transducer thereof, with interposition of a circuit breaker between the signal-receiving transducer and the associated monitoring receiver. A detector forming part of this discriminator may convert the periodically recurrent characteristic component of an incoming test signal into a train of equispaced control pulses whose cadence corresponds to the recurrence period of that signal component. The control pulses trigger a timer, such as a monostable multivibrator or monoflop, which measures a predetermined delay period slightly less than the spacing of the control pulses and, at the end of that delay period, triggers a gating circuit such as another monoflop to establish a gating interval bracketing the next-following control pulse if test-signal reception continues uninterrupted. At least the first one of the two cascaded monoflops should be of the one-shot type, i.e. should not be retriggerable before returning to normal so that its off-normal or astable period cannot be extended. For this purpose the stable output of that monoflop may energize an AND gate in the triggering input thereof so as to give passage to a trigger pulse only in the normal condition of the monoflop.

According to a further feature of my invention, the discriminator additionally comprises electronic switchover means such as a flip-flop inserted between the gating circuit and the controlled circuit breaker to maintain the latter in a circuit-opening position in the presence of equispaced control pulses coinciding with the corresponding gating intervals, the circuit breaker being reversed to establish a working connection between the line and the monitoring receiver in response to an off-cycle pulse not coinciding with any gating interval. Such off-cycle pulses may be generated, for example, by the calling operator at the remote end briefly tapping his selector switch on changing from test-signal transmission to voice transmission.

The completion of a connection from the line via the signal-receiving transducer to the associated monitoring receiver may also serve to disconnect that transducer from a measuring and/or recording instrument normally responding to the incoming test signals.

In order to prevent the premature reactivation of the testing equipment at a signal-receiving station, the discriminator may be designed not to respond to a single pulse pair having the proper spacing but to determine whether a multiplicity of such control pulses arrive in an unbroken succession. Thus, pursuant to this feature of my invention, a pulse counter in the form of a binary frequency divider or of a storage capacitor may be interposed between the gating monoflop and the flip-flop controlling the circuit breaker.

A signal-transmitting transducer at one or both stations advantageously includes an amplification network whose output circuit is normally connected to the line and whose input circuit is connected to a source of test signal which may be of the type described in U.S. Pat. No. 3,414,809. My preferred circuitry for coupling the monitoring receiver of a transmitting station to the line in conjugate relationship with that signal source comprises a differential amplifier with a first input connected to the output circuit of the amplification network and with a second input connected in a balanced manner to the input circuit of that network. More particularly, the amplification network may include an emitter-follower transistor having its collector tied to the first input of the differential amplifier whose second input is then connected to a calancing resistor linked with the base of the emitter-follower transistor through an inverting preamplifier stage. Alternatively, an operational amplifier of that network may serve to decouple the monitoring receiver from that signal source while allowing incoming voice signals to reach one input of the differential amplifier.

If the voice-communication equipment of either station is the handset of a telephone apparatus or a similar unit combining transmission and reception means, the monitoring receiver of that station may be disconnected from the line in the conversation phase. If, however, the equipment comprises only a voice transmitter, the monitoring receiver (e.g. a loudspeaker) may translate the incoming voice currents into sound during the entire conversation. In that event the operator-controlled selector switch may also serve to establish an alternate connection, independent of the associated signal transducer, to the line as long as no test signals are to be transmitted.

In a simple system according to my invention, only one station transmits test signals to the other; in a more elaborate system, each station is switchable between transmission and reception of test signals apart from a possible switchover to voice communication. In both instances, the operator at either station may initiate such a switchover as will be more fully described hereinafter.

BRIEF DESCRIPTION OF THE DRAWING

The above and other features of my invention will now be described in detail with reference to the accompanying drawing in which:

FIG. 6 is a more detailed circuit diagram of a transmitting station forming part of the system of FIG. 1;

FIG. 7 is a circuit diagram similar to FIG. 6, illustrating a modification;

FIG. 8 is a block diagram generally similar to that of FIG. 1, showing a more complex system according to the invention; and FIG. 9 is a block diagram similar to FIG. 8, illustrating a further embodiment.

SPECIFIC DESCRIPTION

Figure 1:
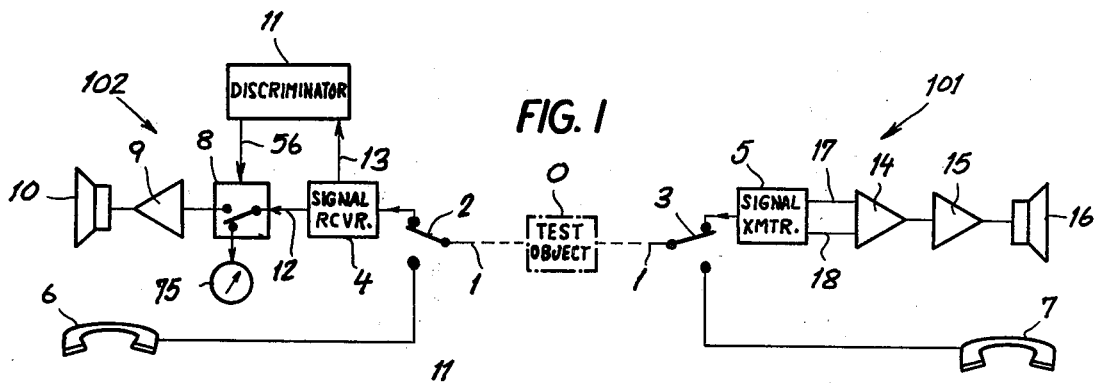
FIG. 1 is a block diagram of a measuring system embodying my invention.

In FIG. 1 I have shown two stations 101 and 102 interconnected by a transmission line 1 (assumed to be of the two-wire type) in series with a test object 0, e.g. a four-terminal network. Station 101 comprises a first transducer 5, referred to hereinafter as a signal transmitter, normally connected to the line 1 by way of a manually operable selector switch 3. A complementary transducer 4 at station 102, referred to hereinafter as a signal receiver, is also normally connected to the line via a selector switch 2 operable independently of the switch 3. Switch 2, when reversed, connects a telephone handset 6 to the line 1 in lieu of signal receiver 4; switch 3, similarly, is operable to connect a handset 7 to the line in lieu of signal transmitter 5.

Signal receiver 4 has an output 12 extending via a normally open circuit breaker 8 and an amplifier 9 to a monitoring receiver 10 shown as a loudspeaker. Circuit breaker 8 is an advantageously electronic switch blocking, in the illustrated position, any transmission of signals from receiver 4 to amplifier 9 and simultaneously directing such signals to a measuring instrument and/or recorder 75.

In accordance with an important feature of my invention, receiver 4 has an ancillary output 13 leading to a discriminator 11 which determines whether the incoming signals do or do not include a recurrent characteristic component of predetermines repetition frequency or cadence. If such a component is present, e.g. if there is a periodical changeover of carrier frequency or if a carrier is intermittently modulated with an identification frequency, an output 56 of discriminator 11 maintains the circuit breaker in its illustrated blocking position. If however, the characteristic signal component disappears, circuit breaker 8 is closed and completes a working connection between receiver 4 and loudspeaker 10 by way of amplifier 9.

At station 101 a differential amplifier 14 has its two inputs 17 and 18 connected in a balanced manner to signal transmitter 5 as more fully described hereinafter with reference to FIGS. 6 and 7. Differential amplifier 14 works through a final amplifier stage 15 into another monitoring receiver 16 also shown as a loudspeaker.

Normally, with selector switches 2 and 3 in their illustrated position, a test signal sent out by transmitter 5 of station 101 reaches the receiver 4 of station 102 and, on being recognized as such, is fed to instrument 75 but cannot pass to the monitoring receiver 10. The signal generated in transducer 5 is balanced out on inputs 17 and 18 of differential amplifier 14 and, accordingly, does not energize the loudspeaker 16.

If, however, the operator at station 101 reverses the switch 3 to connect the handset 7 across the line, the transient generated by this reversal trips the discriminator 11 which thereupon moves the circuit breaker 8 into its alternate position, disconnecting the line 1 from instrument 75 and connecting it instead to loudspeaker 10. The operator at station 102, on being alerted by a sound from the loudspeaker, reverses his selector switch 2 to connect the handset 6 across the line for conversation with his counterpart at station 101.

Conversely, if the operator at station 102 wishes to address his partner at station 101, he reverses the switch 2 and talks into the microphone of handset 6. The voice signals now traveling over the line 1 to transmitter 5 are not balanced out in the input circuit of differential amplifier 14 and therefore reach the loudspeaker 16 to apprise the operator of station 101 that a changeover from the test mode to the conversation mode is desired by his partner. He then reverses the switch 3 whereupon conversation between the two operators may proceed in the same manner as in the previous instance.

Figure 2:
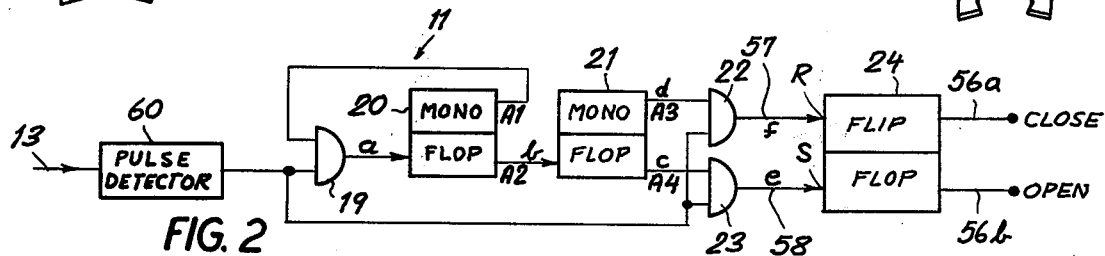
FIG. 2 is a circuit diagram of a discriminator at a receiving station forming part of the system of FIG. 1.

In FIG. 2 I have shown details of the discriminator 11 which comprises a pulse detector 60 connected to the ancillary output 13 of signal receiver. In response to the recurrent characteristic component of the incoming test signal, detector 60 generates a train of narrow control pulses $a$ as shown in the top graph of FIG. 3. This pulse train is fed in parallel to three AND gates 19, 22 and 23, gate 19, working into a triggering input of a monoflop 20 having a stable output A1 tied to another input of AND gate 19 and further having an astable output A2 connected to a triggering input of another monoflop 21. The stable output A3 and the astable output A4 of the latter monoflop are connected to respective inputs of AND gates 22 and 23 whose outputs 57 and 58 respectively energize a resetting input R and a setting input S of a flip-flop 24 having a reset output 56$a$ and a set output 56$b$; these latter outputs are diagrammatically represented in FIG. 1 by the lead 56.

Figure 3:
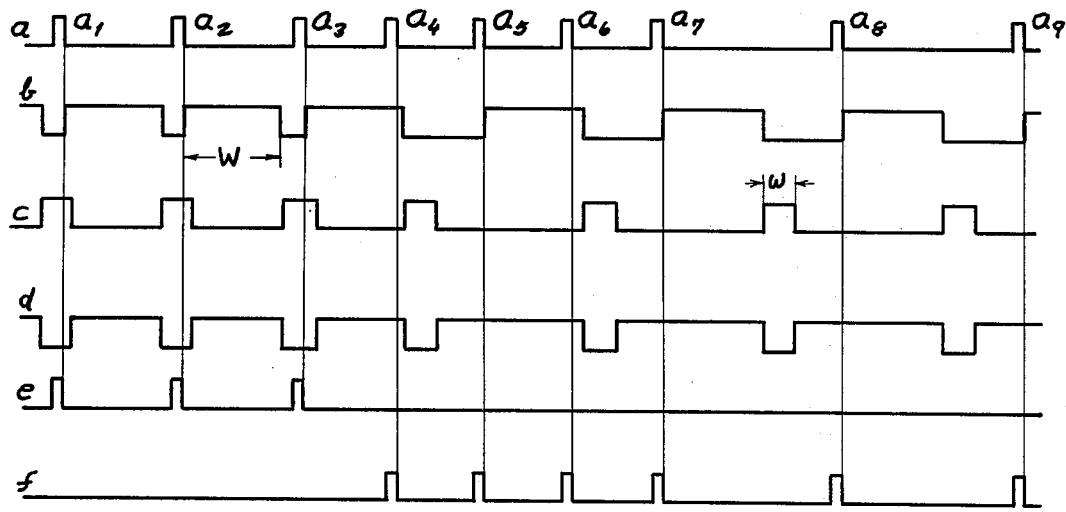
FIG. 3 is a set of graphs serving to explain the operation of the discriminator of FIG. 2.

Monoflop 20 has a relatively long off-normal period W representing the width of a pulse $b$, shown in the second graph of FIG. 3, which is transmitted by its output A2 to monoflop 21 upon being generated by the trailing edge of a pulse $a$ received by its triggering input. In the presence of pulse $b$, input gate 19 is blocked by the de-energization of monoflop output A1; naturally, gate 19 could also have an inverting input connected to the alternate monoflop output A2 with identical results. Thus, any irregular pulse delivered by detector 60 in the dealy period W has no effect upon the operation of monoflop 20. The trailing edge of pulse $b$ triggers the monoflop 21 which has a considerably shorter off-normal period $c$ (third graph of FIG. 3) representing a gating pulse on output A4 of this monoflop. This gating pulse opens the AND gate 23 for the passage of the next-following control pulse $a$ in the form of a setting pulse $e$ (fifth graph of FIG. 3) for flip-flop 24. The negation of pulse $c$, appearing as a pulse $d$ (fourth graph of FIG. 3) on the output A3 of monoflop 21, opens the AND gate 22 for the passage of any off-cycle pulse giving rise to a resetting pulse $f$ for flip-flop 24 as illustrated in the bottom graph of FIG. 3. It will be noted from these graphs that the width $w$ of gating pulses $c$ exceeds only slightly the width of control pulses $a$ which, therefore, will coincide with these gating pulses only if their repetition period is greater than width W of pulses $b$ but smaller than the combined width $W + w$ of pulses $b$ and $c$. The discriminator 11, therefore, constitutes in effect a band-pass filter for pulses having the requisite repetition frequency.

By way of an example, and in conformity with C.C.I.T.T. recommendations as per Document AP V, No. 34 E, pages 202–213 (Geneva, November 1972), the control pulses $a$ recur with a mean frequency of 4.16 Hz corresponding to a repetition period of about 240 ms; thus, delay period W may be selected at approximately 235 ms which, with $w \approx 10$ ms, corresponds to a bandwidth of substantially 0.2 Hz.

For purposes of illustration I have shown in the top graph of FIG. 3 a group of three pulses $a_1, a_2, a_3$ whose cadence corresponds to that of the characteristic signal component, lying between W and $W + w$. Pulses $a_1 - a_3$, therefore, give rise to respective pulses $e$ on output lead 58 of AND gate 23. Next, several pulses $a_4 - a_7$ appear with reduced spacing; thus, the first pulse $a_4$ of this series comes into existence simultaneously with a pulse $b$ from monoflop 20, i.e. prior to the generation of the next gating pulse $c$, so as to coincide with a pulse $d$ on output A3 of monoflop 21 and to pass the AND gate 22 as a pulse $f$ on lead 57. The next pulse $a_5$ finds the monoflop 20 again in its stable position and is therefore able to trigger same but, since monoflop 21 has also returned to normal, this pulse $a_5$ can pass only through AND gate 22 and produces another resetting pulse $f$ for flip-flop 24. Such resetting pulses are also generated by the next two incoming pulses $a_6$ and $a_7$ in the same manner as with pulses $a_4$ and $a_5$. Thereafter, two pulses $a_8$ and $a_9$ are arceived with a spacing exceeding the normal limit $W + w$. Pulse $a_8$, accordingly, coincides with the normal states of the two cascaded monoflops and finds the AND gate 22 conducting, as does the pulse $a_9$; in both instances, therefore, further resetting pulses $f$ appear on lead 57.

Figures 4, 5:
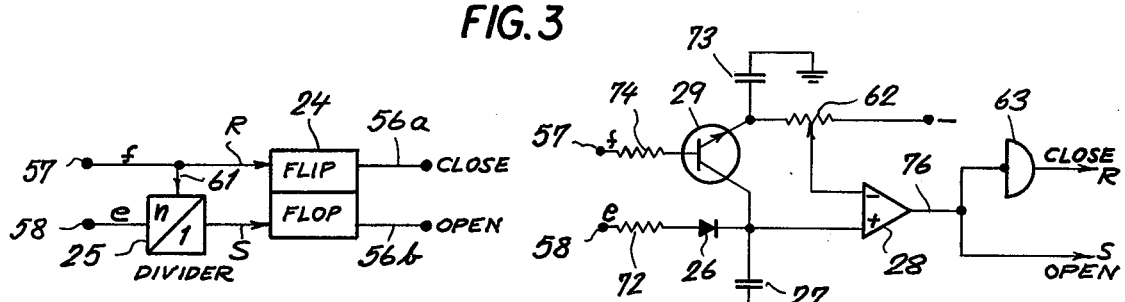
FIG. 4 shows details of a pulse counter which may be included in the discriminator of FIG. 2.
FIG. 5 shows an alternate form of pulse counter for that discriminator.

FIG. 4 shows a binary frequency divider 25 of step-down ratio $n : 1$ interposed between the output 58 of AND gate 23 (FIG. 2) and the input S of flip-flop 24. Output lead 57 of AND gate 22 is connected to a zeroizing input 61 of divider 25 in parallel with the resetting input R of flip-flop 24. Thus, the flip-flop will be set only if there is an unbroken sequence of at least $n$ control pulses $a$ giving rise to pulses $e$ on lead 58. If any off-cycle pulse causes the appearance of a pulse $f$ on lead 57, divider 25 and flip-flop 24 are reset so that lead 57$a$ is energized instead of lead 56$b$ to close the previously open circuit breaker 8 (FIG. 1).

In FIG. 5 I have shown an alternate pulse-counting circuit comprising a storage capacitor 27 which is chargeable from output lead 58 via a resistor 72 and a diode 26, the ungrounded plate of this capacitor being tied to the collector of an NPN transistor 29 whose emitter is connected to negative potential through a potentiometer 62 and to ground through another capacitor 73. Lead 57 is connected to the base of transistor 29 through a resistor 74, this transistor being cut off in the absence of a pulse $f$ on that lead so that the charge of capacitor 27 increases progressively with successive pulses $e$ on lead 58. Capacitor 27 and the tap of potentiometer 62 are connected to respective input terminals of a voltage comparator 28 with an output lead 76 which is de-energized until the capacitor charge reaches a predetermined threshold. In this de-energized state, lead 76 energizes the resetting input through an inverter 63 so that circuit breaker 8 of FIG. 1 is closed. When, however, the charging threshold of capacitor 27 has been reached as a result of a series of pulses $e$, lead 76 carries current and sets the flip-flop 24 to open the circuit breaker 8 and to establish the normal testing position. Any irregular pulse $f$ intervening between pulses $e$ discharges the capacitor 27 and recloses the circuit breaker 8.

FIG. 6 shows details of a signal transmitter 5 adapted to be used in the system of FIG. 1 as well as in those described below with reference to FIGS. 8 and 9. This transmitter comprises an amplification network including an inverting preamplifier 31 which receives, on an input terminal 68, the output of a test-signal generator 67 producing, for example, an alternation of carrier frequencies changing over at a rate of 4.16 Hz, the carriers being modulated by a split frequency as well as, intermittently, by an identification frequency in the manner discussed in U.S. Pat. No. 3,414,809. The identification frequency may have a magnitude of 160 Hz so that a control pulse *a*, if integrated over a full cycle thereof, has a width of about 7 ms which is somewhat less than the width *w* of a gating pulse *c* (FIG. 3). The test signal is developed across a potentiometer 30 and is applied by preamplifier 31 to the base of an NPN transistor 32 connected as an emitter follower, appearing with opposite polarities across an emitter resistor 64 and a collector resistor 65. An output transformer 33, bridged across resistor 64, energizes the line 1 through a series resistance 66 and the selector switch 3 in the normal or test position thereof.

The inputs 17, 18 of differential amplifier 14 are respectively connected to the collector of transistor 32 and to a tap on potentiometer 30 which is so adjusted that the two input voltages are equal and therefore balance each other if only the output of signal source 67 is fed to network 31, 32. If, however, an external voltage such as a click or a voice signal from station 102 arrives over line 1 and traverses the transformer 33 in the opposite direction, the resulting voltage drop across resistor 65 alters the conductivity of transistor 32 which in this instance operates in the common-base mode. The concomitant change in the collector potential of the transistor is communicated to input 17 of differential amplifier 14 but is not compensated by a balancing voltage on input 18. The internal impedance of the transmitter 5, as seen from the line, is mainly that of resistance 66.

In FIG. 7 I have shown an alternate signal transmitter 5* which can be used in place of transmitter 5 in any of the systems herein disclosed. Transmitter 5* comprises an amplification network consisting essentially of an operational amplifier 34 whose inverting input is grounded through a resistor 71 whereas its noninverting input receives the output of signal generator 67 (FIG. 6) from terminal 68. Amplifier 34 has an output resistor 69 and a feedback resistor 70 closing a loop to its inverting input. Coupling transformer 33, whose primary winding (as seen from the amplifier output) is connected to the junction of resistors 69 and 70, is energized from the operational amplifier 34 with an internal resistance of virtually zero. The output of amplifier 34 is directly connected to the input 17 of the differential amplifier 14 whose other input 18 is again joined to a tap of potentiometer 30 which in this case lies between ground and the noninverting amplifier input. Thus, as in the transmitter 5 of FIG. 6, the test signal appears with the same magnitude and polarity on the inputs of differential amplifier 14 which therefore has no output due to this signal.

An incoming voice signal traversing the transformer 33 is transmitted with little attenuation by way of resistor 69 as well as the feedback path of operational amplifier 34 to the input 17 of differential amplifier 14 whose other input 18 is not energized by that signal. Amplifier 14, therefore, actuates the loudspeaker 16 via amplification stage 15.

FIG. 8 illustrates the application of my invention to a measuring system designed for selective transmission of a test signal between two stations 201 and 202 in either direction via test line 1 and a nonillustrated test object. Station 201 has an outgoing branch with the same components 5, 14, 15, 16 as station 101 in FIG. 1 and, in addition, comprises an incoming branch with a signal receiver 4′, a circuit breaker 8′ in series therewith and a discriminator 11′ controlling same in the aforedescribed manner. Conversely, station 202 is here equipped with a supplemental outgoing branch including a signal transmitter 5′ and a differential amplifier 14′. The monitoring receiver of station 201 and its amplifier stage have been designated 16′ and 15′, respectively.

In this instance the voice-transmitting equipment normally disconnected from line 1 is limited to a microphone 48 at station 201 and a microphone 48′ at station 42′. Microphone 48 can be connected to the line, in series with an amplifier 42 and a hybrid coil 41, via a three-position selector switch 38 ganged with two similar switches 39 and 43. In like manner, microphone 48′ is connectable to line 1 in series with an amplifier 42′ and a hybrid coil 41′ by way of a three-position selector switch 36 which is ganged with a similar switch 37.

In the illustrated upper switch position, station 202 transmits a test signal from a generator within its transducer 5′ to the line for reception at transducer 4′ of station 201 and delivery to a nonillustrated measuring or recording instrument via circuit breaker 8′. In the middle switch position, the transmission of a test signal takes place from transducer 5 at station 201 to transducer 4 at station 202 in the same manner as in the system of FIG. 1.

If, with station 202 transmitting, the operator at that station wishes to change over to voice communication, he moves the switches 36 and 37 from their upper to their lower position which disconnects the signal transmitter 5′ from line 1 and connects both the microphone 48′ and the loudspeaker 16′ to the line via amplifiers 42′, 15′ and hybrid coil 41. At station 201, loudspeaker 16 reproduces the voice of the distant operator whereupon his local partner places the switches 38, 39, 43 in the corresponding lower position so that receiver 4′ is now also disconnected from the line. Hybrid coil 41, connected to line 1 via switch 38, communicates with microphone 48 by way of amplifier 42 and with loudspeaker 16 through the intermediary of switch 43, transmitter 5, differential amplifier 14, switch 39 and amplifier 15.

If, under the same initial conditions, voice communication is initiated by the operator at station 201 reversing the switches 38, 39 and 43, his counterpart at 202 is alerted by the sounds from loudspeaker 16′ in the manner described above and thereupon completes the voice-communication channel by displacing the switches 36 and 37, with the same result as before.

In like manner, either operator may alert the other starting from the intermediate switch position in which test signals are transmitted from station 201 to station 202.

The system of FIG. 9 utilizes a pair of two-wire lines 1A, 1B to facilitate test-signal transmission in either direction between two stations 301, 302. Station 302 has the same equipment as station 102 of FIg. 1, i.e. a signal receiver 4 normally connected to line 1A by a switch 2, a circuit breaker 8, a discriminator 11, an amplifier 9 and a monitoring receiver 10. In addition, this station includes a signal transmitter 5′ normally connected by a switch 3′ to line 1B, the two switches 2 and 3′ being ganged for joint displacement. A telephone handset 6 at station 302 is connectable to line 1A for voice reception and to line 1B for voice transmission, via a hybrid coil 41, in the reversed position of these switches.

Station 301 comprises the counterparts 4′, 8′, 9′, 10′ and 11′ of the above-enumerated components of the receiving branch of station 302, along with a signal transmitter 5 and a microphone 48. Signal receiver 4' is permanently connected to line 1B whereas a switch 3 can be selectively positioned to connect the line 1A either to transmitter 5 or, via a resistor 54 and an amplifier 42, to microphone 48. In the illustrated switch position, test signals from transmitter 5 at station 301 pass over line 1A and through the nonillustrated test object to receiver 4 at station 302 and also from transmitter 5' at the latter station, via line 1B and the test object, to receiver 4' at station 301. If the operator at station 301 reverses the switch 3, voice signals from microphone 48 reach the loudspeaker 10 of station 302 to alert the distant operator who thereupon reverses the switches 2 and 3' for conversation over both lines 1A, 1B with the aid of handset 6 on the one hand and microphone 48 as well as loudspeaker 10' on the other hand. The same mode of operation can be initiated by the operator at station 302 whose voice signals, after reversal of switches 2 and 3', reach the loudspeaker 10' of station 301.

Naturally, the two stations 201, 202 of FIG. 8 or 301, 302 of FIG. 9 could also be identically designed with either a microphone only or a complete telephone handset.

I claim:

1. In a system for measuring transmission characteristics of a test object by way of a test line extending between a first and a second station, said first station being provided with a first transducer sending out a test signal which includes a characteristic component of a predetermined recurrence frequency, said second station being provided with a second transducer for receiving said test signal, the combination therewith of:
   first voice-communication means at said first station;
   second voice-communication means at said second station normally disconnected from said line;
   first switch means at said first station for alternatively connecting said first transducer and said first voice-communication means to said line;
   second switch means at said second station operable independently of said first switch means for connecting said second voice-communication means to said line;
   a first monitoring receiver at said first station responsive to voice signals arriving over said line;
   a second monitoring receiver at said second station responsive to voice signals arriving over said line;
   circuit means at said first station for connecting said first monitoring receiver to said line in decoupled relationship with said first transducer; and
   discriminating means at said second station normally disconnecting said second monitoring receiver from said line, said discriminating means being responsive to the absence of said component for establishing a working connection from said line to said second monitoring receiver.

2. The combination defined in claim 1 wherein said second monitoring receiver is connectable to said line via said second transducer, said discriminating means comprising a circuit breaker between said second monitoring receiver and said second transducer.

3. The combination defined in claim 2 wherein said discriminating means further comprises a detector connected to said second transducer for converting said component into a train of equispaced control pulses, timing means responsive to said control pulses for measuring a predetermined delay period less than the spacing of said control pulses, and gating means responsive to said timing means for establishing an interval at the end of said delay period bracketing the next-following control pulse upon continuing reception of said test signal from said first station, said circuit breaker being responsive to said gating means for preventing establishment of said working connection upon coincidence of a control pulse with said interval.

4. The combination defined in claim 3 wherein said timing means and said gating means comprise a first and a second monostable multivibrator in cascade.

5. The combination defined in claim 4 wherein said first monostable multivibrator has a triggering input connected to said detector, a stable output, and an astable output connected to said second monostable multivibrator, said discriminating means further comprising an AND gate inserted between said detector and said triggering input with an input connection to said stable output.

6. The combination defined in claim 4 wherein said second monostable multivibrator has a stable output and an astable output, said discriminating means further comprising a pair of AND gates with first inputs jointly connected to said detector and with second inputs respectively connected to said stable and said astable output.

7. The combination defined in claim 3 wherein said discriminating means further comprises electronic switchover means inserted between said gating means and said circuit breaker for maintaining the latter in a circuit-opening position in the presence of control pulses coinciding with said interval and in a circuit-closing position in response to off-cycle pulses not coinciding with said interval.

8. The combination defined in claim 7 wherein said switchover means is a flip-flop with a setting input connected to receive said off-cycle pulses from said gating means, further comprising pulse-counting means inserted between said gating means and said setting input for keeping said flip-flop reset until a multiplicity of control pulses are passed in unbroken sequence by said gating means.

9. The combination defined in claim 8 wherein said pulse-counting means comprises a binary frequency divider having a zeroizing input connected in parallel with said resetting input.

10. The combination defined in claim 8 wherein said pulse-counting means comprises a storage capacitor connected to receive said holding pulses from said gating means, normally blocked discharge means connected to said gating means for unblocking by an off-cycle pulse, and a voltage comparator with one input connected to said capacitor and another input connected to said discharge means for energization thereby, said one input having an energization threshold corresponding to an accumulated capacitor charge due to said predetermined number of control pulses.

11. The combination defined in claim 1 wherein said first transducer includes an amplification network with an output circuit normally connected to said line and with an input circuit connected to a source of said test signal, said circuit means comprising a differential amplifier with a first input connected to said output circuit and with a second input connected in balanced relationship to said input circuit.

12. The combination defined in claim 11 wherein said amplification network includes a transistor having a base, an emitter and a collector, said transistor being provided with an emitter resistor and a collector resistor forming part of said output circuit, said line being connected across said emitter resistor, said first input being connected to said collector resistor, said input circuit including a balancing resistor connected to said second input and an inverting stage linking said balancing resistor with said base.

13. The combination defined in claim 11 wherein said amplification network includes an operational amplifier.

14. The combination defined in claim 11 wherein said first switch means is operable to connect said first monitoring receiver to said line independently of said first transducer upon disconnecting the latter from said line.

15. The combination defined in claim 1 wherein said second switch means is operable to disconnect said second transducer from said line upon connection of said second voice-communication means to said line.

16. The combination defined in claim 15 wherein said second monitoring receiver is connectable to said line by way of said second transducer, said second switch means being operable to connect said second monitoring receiver to said line independently of said second transducer upon disconnecting the latter from said line.

* * * * *